(12) United States Patent
Blaskovich et al.

(10) Patent No.: US 7,495,601 B2
(45) Date of Patent: *Feb. 24, 2009

(54) DECLUTTER OF GRAPHICAL TCAS TARGETS TO IMPROVE SITUATIONAL AWARENESS

(75) Inventors: Jon A. Blaskovich, Surprise, AZ (US); Stephen G. McCauley, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/776,088

(22) Filed: Jul. 11, 2007

(65) Prior Publication Data

US 2007/0252749 A1   Nov. 1, 2007

Related U.S. Application Data

(63) Continuation of application No. 10/907,428, filed on Mar. 31, 2005, now Pat. No. 7,307,578.

(51) Int. Cl.
  *G01S 13/93*  (2006.01)
(52) U.S. Cl. .................... 342/29; 342/179; 342/181
(58) Field of Classification Search .................. 342/29
   See application file for complete search history.

(56) References Cited

U.S. PATENT DOCUMENTS

| | | | | |
|---|---|---|---|---|
| 3,134,975 A | * | 5/1964 | Goodman | 342/136 |
| 3,611,371 A | * | 10/1971 | Morse | 342/29 |
| 5,077,673 A | * | 12/1991 | Brodegard et al. | 701/301 |
| 5,179,377 A | * | 1/1993 | Hancock | 340/961 |
| 5,566,074 A | * | 10/1996 | Hammer | 701/301 |
| 5,936,552 A | * | 8/1999 | Wichgers et al. | 340/963 |
| 6,272,431 B1 | * | 8/2001 | Zamojdo et al. | 701/211 |
| 6,348,877 B1 | * | 2/2002 | Berstis et al. | 340/980 |
| 6,433,729 B1 | * | 8/2002 | Staggs | 342/29 |
| 6,977,630 B1 | * | 12/2005 | Donath et al. | 345/7 |
| 2002/0011950 A1 | * | 1/2002 | Frazier et al. | 342/357.08 |
| 2003/0016158 A1 | * | 1/2003 | Stayton et al. | 342/29 |
| 2004/0024527 A1 | * | 2/2004 | Patera | 701/301 |
| 2004/0024528 A1 | * | 2/2004 | Patera et al. | 701/301 |
| 2004/0174295 A1 | * | 9/2004 | Stayton et al. | 342/182 |

* cited by examiner

*Primary Examiner*—Thomas H Tarcza
*Assistant Examiner*—Matthew M Barker

(57) ABSTRACT

Traffic collision and avoidance systems and methods for a host aircraft. The system receives traffic information from one or more target aircraft, determines threat levels of target aircraft associated with the received traffic information, generates one or more objects based on the determined threat levels and a pre-defined threat level, and displays the generated one or more objects that are associated with threat levels within the pre-defined threat level. A first indicator that indicates lateral position relative to the host aircraft and a second indicator that indicates vertical direction of travel of the associated target aircraft are also displayed.

14 Claims, 4 Drawing Sheets

US 7,495,601 B2

DECLUTTER OF GRAPHICAL TCAS TARGETS TO IMPROVE SITUATIONAL AWARENESS

PRIORITY CLAIM

This is a continuation application of U.S. patent application Ser. No. 10/907,428 filed Mar. 31, 2005 now U.S. Pat. No. 7,307,578 and is incorporated herein by reference.

BACKGROUND OF THE INVENTION

Current aircraft display systems represent Terrain Collision Avoidance System (TCAS) target information using a standardized set of graphical symbols, see FIG. 1. However, present composite displays (horizontal and vertical situation displays) may be cluttered at times of high traffic, thus making it difficult to determine the location of true threats.

Also, in present vertical situation displays, it is impossible to determine whether a displayed target is left or right of the aircraft's present flight path/plan.

Therefore, there exists a need for improving presentation of TCAS target information on composite displays.

SUMMARY OF THE INVENTION

The present invention provides traffic collision and avoidance systems and methods for a host aircraft. The host aircraft includes a receiver that receives traffic information from one or more target aircraft, a processor that determines threat levels of target aircraft associated with the received traffic information, and generates one or more objects based on the determined threat levels and a pre-defined threat level, and a display that displays the generated one or more objects that are associated with threat levels within the pre-defined threat level.

The display includes a vertical situation display with each displayed object having a first indicator that indicates lateral position relative to the host aircraft and a second indicator that indicates vertical direction of travel of the associated target aircraft.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention may be described in terms of functional block diagrams and various processing steps. Such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the figures or the specification are not to be construed as limiting the order in which the individual processing steps may be performed. The particular implementations shown and described herein are illustrative of the invention and its best mode and are not intended to otherwise limit the scope of the invention in any way.

Figure 2:
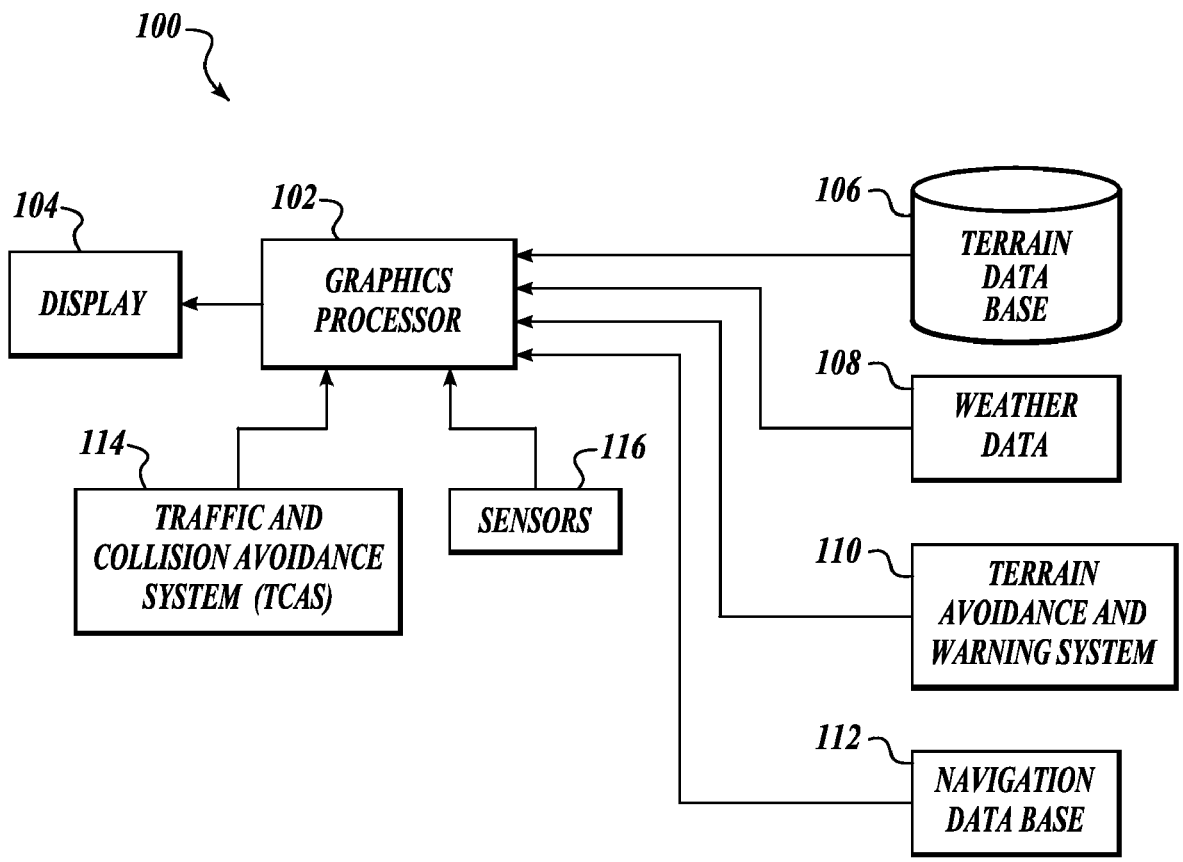
FIG. 2 is an example system formed in accordance with the embodiment of the present invention.

In FIG. 2, an exemplary display system 100 includes a graphics processor 102 configured to provide information to a display device 104. One or more data sources are coupled to the processor 102. These data sources may be, but are not limited to a terrain database 106, a weather radar data source 108 from and on-board weather radar unit or from an external weather data source such as a ground-based weather data source or a satellite weather data source, a terrain avoidance and warning system (TAWS) 110, a navigation database 112, a traffic collision and avoidance system (TCAS) 114 or other sensors 116 which may provide additional useful information to a user.

A number of aspects of the display device 104 (which are controlled by the processor 102 in a practical embodiment) may contribute to the improved contents and appearance of the display, thus increasing the situational awareness of the pilot and/or flight crew. The image generation and display aspects may leverage known techniques such that existing display systems can be modified in a straightforward manner to support the different features described herein. In a practical implementation, the concepts described herein may be realized in the form of revised display generation software or processing resident at the processor 102 or at the TCAS 114.

The processor 102 encompasses one more functional blocks used to provide a flight management, navigational, weather and positional interface with the pilot, and input to the display device 104. The processor 102 may include or cooperate with a mode, position and/or detection element that is capable of determining the mode or position of the vehicle relative to one or more reference locations, points, planes, or navigation aids. In addition, the processor 102 may be configured to receive, analyze, condition, and process navigation and positional information as well as weather information associated with the vehicle. In this regard, the processor 102 may include any number of individual microprocessors, flight computers, navigation equipment, memories, storage devices, interface cards, and other standard components known in the art. Moreover, the processor 102 may include any number of microprocessor elements, memory elements, power supplies, and other functional components as necessary to support the operation of the display system 100. In this respect, the processor 102 may include or cooperate with any number of software programs or instructions designed to carry out various methods, process tasks, calculations, control functions, and the generation of display signals and other data used by the display device 104. For example, the processor 102 may be configured to generate an annunciation associated with the position of the aircraft relative to at least one reference location, to generate windows corresponding to user inputs, to combine inputs from various sensors to create a single data stream for presentation to the display device 104, and the like.

The processor 102 may also be suitable configured to receive and process navigational data related to an intended destination of the aircraft. In a practical commercial aircraft application, such navigational data may be associated with specific waypoints, airports, navigational aids, or the like. The processor 102 may process data from any of the data inputs shown above and generate appropriate signals to the display device 104 such that the display device 104 generates indicia representative of the appropriate navigational, weather, terrain, or other information, or the like. Such processors and flight control computers are available from a number of manufacturers such as Honeywell International Inc. In an exemplary embodiment, the processor 102 is incorporated within a flight management system (FMS) or another avionics component which, inter alia, formats navigation and traffic data and forwards the data to the display device 104 for display.

The display device 104 may include any display element suitable for displaying the various symbols and information detailed below. Many currently known monitors are suitable for this task, including various CRT and flat-panel display systems. Display device 104 may be based on a panel mounted display, a heads-up display (HUD) projection, or any known technology. In an exemplary embodiment, the display device 104 includes a panel display. In one embodiment, the display device 104 is a composite display having multiple view displays, one of which is a vertical situation display. Also, the display device 104 may a vertical situation mode of display.

In operation, the processor 102 obtains inertial data (position, speed, direction) from the sensors 116. Based on the inertial data, the processor 102 obtains terrain data and navigation data from the databases 106, 112. These databases are typically onboard the aircraft, but need not be limited to such a design. The processor 102 renders a picture of the absolute terrain, and the navigation data (VHF (Very High Frequency) Omni-directional Radio-range (VORs), airports, airways, etc.) is also rendered on the display device 104. Overlaid on top of this picture is data from the TCAS 114, the TAWS 110 and the weather data source 108. The TCAS 114 provides information regarding other aircraft located in the vicinity. The TCAS data may consist of, but is not limited to, speed, direction, altitude, and altitude trend. Each aircraft is drawn on the display device 104 by the processor 102. In one embodiment, only icons associated with other aircraft that meet a certain threat level criteria are presented on the display device 104. Also, the relative position, vertical velocity and threat level of the other aircraft are used to determine what aspects of display icons to generate and display of a vertical situation display. The weather data source 108 provides the location of weather cells to the processor 102. This data consists of the location of precipitation which is shown in various colors on the display based on the water content of the weather cells. The processor 102 renders the location of the cells on the display. The TAWS 110 provides data to the processor 102 regarding the location of terrain that may be a threat to the aircraft. The processor 102 may show the potential threat terrain in various colors depending on the level of threat: red for warnings (immediate danger), yellow for cautions (possible danger), and green for terrain that is not a threat.

Figure 3:
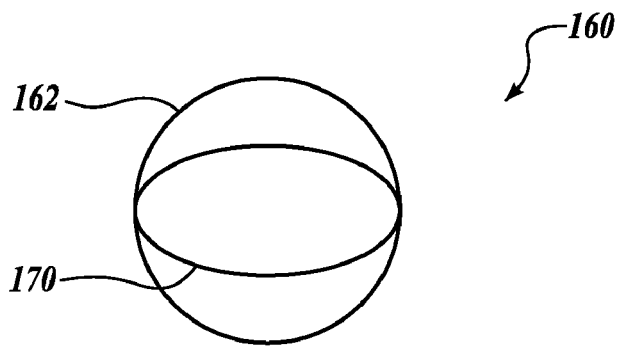
FIG. 3 illustrates targets to be presented on a composite display as formed in accordance with the embodiment of the present invention.
Figure 3:
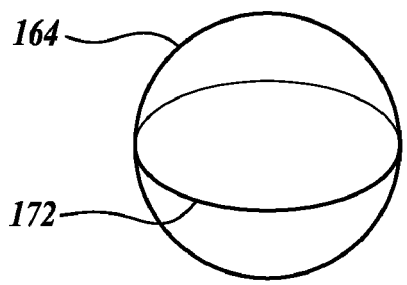
Figure 3:
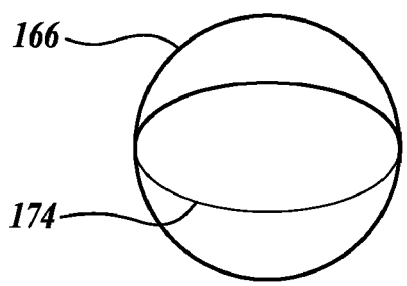
Figure 3:
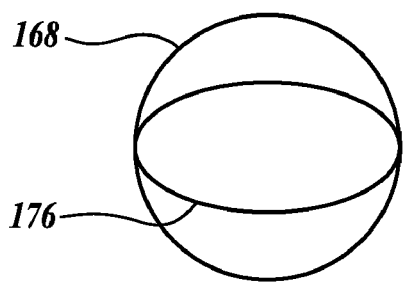

FIG. 3 illustrates various display objects 160 that are generated by either the TCAS 114 or the processor 102. The display objects 160 are presented on a vertical situation display where their position on the display indicates altitude of associated aircraft. The objects 160 also indicate lateral information relative to the operating aircraft and particular relevance (i.e., threat level) as determined by the TCAS 114. In this embodiment, the display objects 160, are circles 162-168 that appear to include an equator line 170-176 that gives each of the circles 162-168 a spherical appearance. The equator lines 170-176 appear as ovals within the circles 162-168. The ovals include a top half and a bottom half. The top half of the equator lines is assumed in this embodiment to be on a back side of a sphere, assuming the circle is a sphere and the bottom half of the oval resides on the front half of the same sphere.

With regard to the first circle 162 and the fourth circle 168, the equator lines 170 and 176 have top and bottom halves that have equal display intensity within the respective circle 162 and 168, thus meaning that the aircraft associated with the circles 162 and 168 are located within a threshold distance from the host aircraft's present flight path/plan.

A second circle 164 includes an equator line 172 with the bottom half having a greater intensity than the top half. Therefore, when the circle 164 is presented within the vertical situation display, the circle 164 indicates that the aircraft associated with the object 164 is greater than a threshold distance to the starboard or right of the aircraft's flight path/plan. The reverse is true for the third circle 166 that shows that the top half of the equator line 174 is brighter than the bottom half of the equator line 174.

Figure 1:
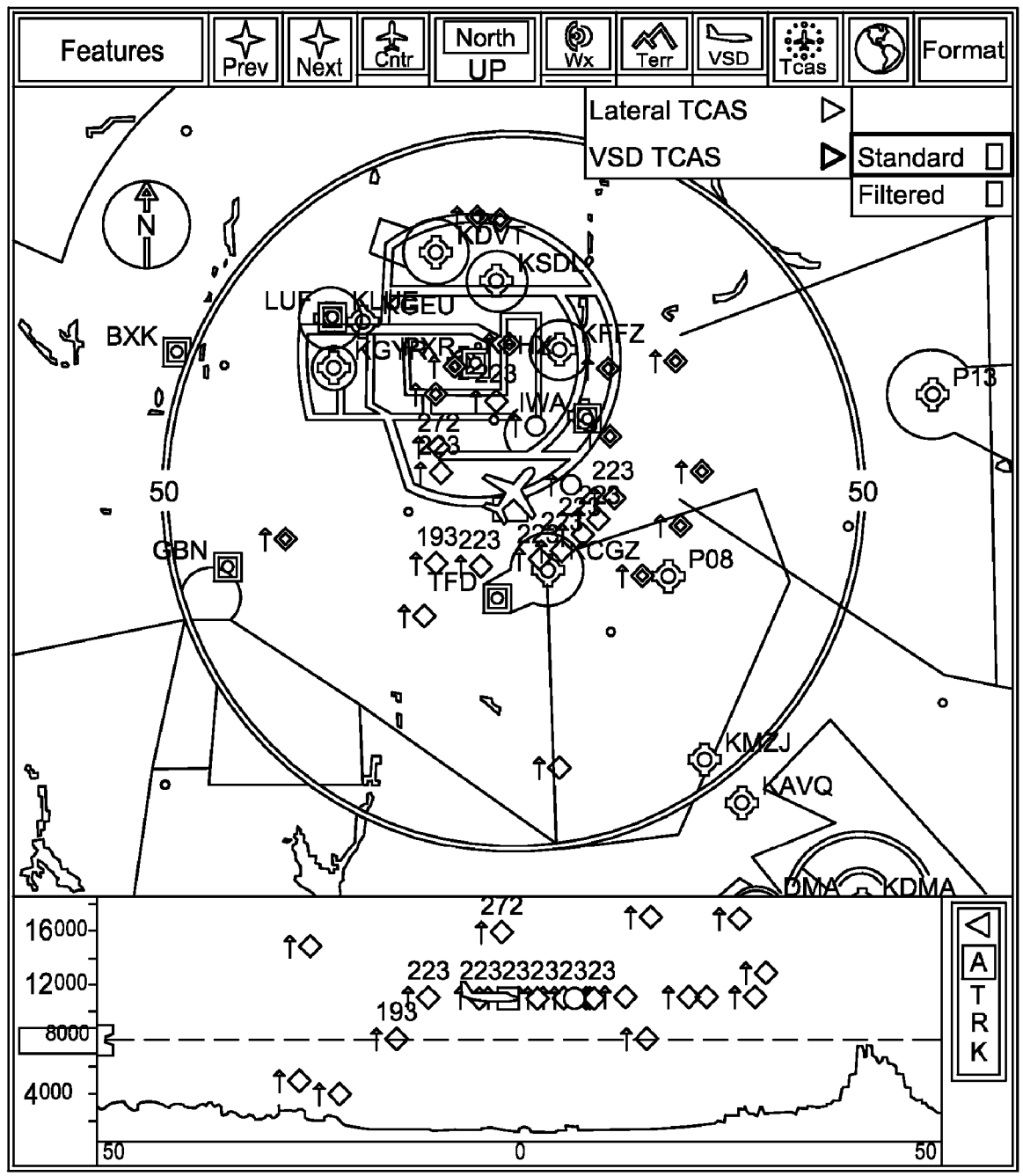
FIG. 1 illustrates a composite display formed in accordance with the prior art.

The objects 160 may also present other information, such as threat level and relative importance of the threat. In the composite display shown in FIG. 1, the circles 162-168 are applied a color depending upon the threat level of associated target aircraft. In one embodiment, the same color scheme is used in the present invention and applied to the objects 160. For example, red indicates the highest threat level followed by amber and then blue. This will be illustrated in more detail below with regard to FIG. 4.

Display intensity of the color of the icons identifies threat level of the associated threat aircraft. This also will be shown by example in more detail below in FIG. 4. Also, the size of the objects 160 further indicates the threat level of an associated target aircraft. This also will be shown in more detail below in FIG. 4.

Figure 4:
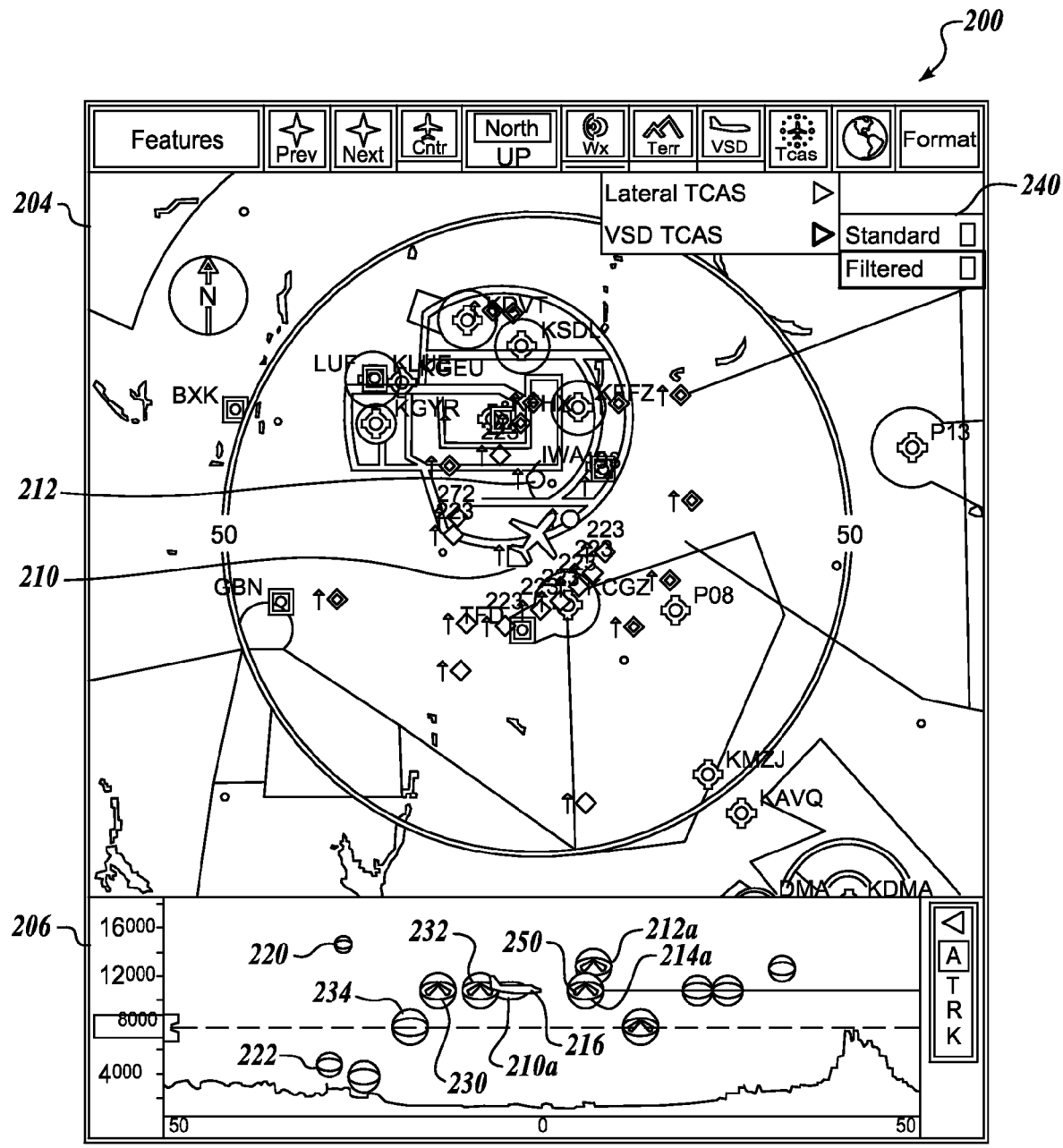
FIG. 4 illustrates an example composite display that presents TCAS target information in accordance with the embodiment of the present invention.

FIG. 4 illustrates a composite display 200 formed in accordance with an embodiment of the present invention. The composite display 200 includes a horizontal situation display 204 and a vertical situation display 206. As shown in the horizontal situation display 204, a high alert icon 210, two medium alert icons 212 and 214, as well as numerous low priority TCAS icons are displayed. The high priority icon 210 is displayed in red. The medium priority icons 212 and 214 are displayed as amber icons and the remaining TCAS icons are displayed as blue. All icons that are displayed as red or yellow in the horizontal situation display 204 is presented within the vertical situation display 206 with the same color.

When the vertical situation display 206 is in a filter mode, as selected by a pull-down menu 240 or selected or activated by some other comparable means, only the targets associated with objects that are presented in the horizontal situation display 204 that are within a threshold threat value are presented. In one embodiment, the filtering of targets is calculated using a historical record of target and host aircraft direction vectors. The host aircraft's direction vector is compared to target aircraft direction vectors and if the comparison indicates that a target aircraft direction vector is not within a threshold (i.e., angular threshold), the target is completely removed from being displayed. As shown in the vertical situation display 206 two blue icons 230 and 232 are shown aft of an aircraft icon 216 that represents the host aircraft. The icons 230 and 232 include equator lines with bottom halves having greater intensity than top halves, thereby meaning that the associated target aircraft are to the right of the aircraft's line of flight. Also, the icon 230 has greater intensity than the icon 232, thus meaning that the aircraft associated with the icon 230 is more of a threat than the aircraft associated with the icon 232. The level of threat is assessed by a number of parameters, such as speed, direction of travel relative to the host aircraft, altitude, and other factors. In one embodiment, the level of threat is determined by the TCAS 114.

Also shown in the vertical situation display 206 may display icons of various sizes, such as icons 220 and 222. Aircraft associated with smaller icons have a lower threat level than aircraft associated with larger icons.

Also shown are transparent blue icons. Aircraft associated with transparent blue icons have a lessor threat value than those associated with solid blue icons.

A red icon 210*a* corresponds to the icon 210, an amber icon 214*a* corresponds to the icon 214 and an amber icon 212*a* corresponds to the amber icon 212 in the horizontal situation display 204. The icon 214*a* indicates that it is to the right of the aircraft's flight path/plan because the bottom half of the equator line is of higher intensity than the top half of the equator line and the amber icon 212*a* is to the left of the aircraft's flight path/plan, because the top half of the equator line is of a greater intensity than the bottom half.

Thus, it is easy for the flight crew to interpret the visual cues presented in the vertical situation display 206. If the flight crew wants to determine what aircrafts are presently along their flight path/plan, they just look for all of the icons with equator lines of constant intensity between the top and bottom halves. In this example that includes icons 210*a* and 234. It is also easy to see the altitudes of target aircraft of various threat levels.

In one embodiment, the icons presented within the vertical situation display 206 also include a vertical motion indicator 250. If the vertical motion indicator 250 creates an arrow that points to the top of the vertical situation display 206, then the aircraft associated with that icon is climbing. And of course if the vertical motion indicator 250 is an arrow that points down, the aircraft is descending. If the vertical motion indicator 250 does not point up or down or is not displayed, then the associated target aircraft is flying straight and level.

The present invention may be implemented on various aircraft displays, such as a Primary Flight Display (PFD), Lateral Map, Vertical Map, Horizonal Situation Indicator (HIS), Advanced Vision System (AVS), or any perspective display device.

While the preferred embodiment of the invention has been illustrated and described, as noted above, many changes can be made without departing from the spirit and scope of the invention. For example, the icons may be various shapes, sizes, or colors provided they present comparable information as that shown and described above. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A traffic collision and avoidance method for a host aircraft, the method comprising:
   receiving traffic collision and avoidance information from one or more targets;
   filtering the one or more targets based on a threshold value; and
   displaying one or more objects that are associated with one or more target aircraft that remain after filtering on a vertical situation display,
   wherein displaying includes displaying the objects in one of two or more sizes based on threat level information included in the traffic collision and avoidance information and presenting in a vertical profile view; and
   wherein the threshold value includes a position threshold value and a threat threshold value,
   wherein displaying includes indicating lateral direction relative to the host aircraft using a graphical object having an equator line, the equator line includes two halves, when a first one of the two halves is displayed in a first manner, the associated target aircraft is laterally left of the host aircraft, when the second one of the two halves is displayed in the first manner, the associated target aircraft is laterally right of the host aircraft, when one of the halves is displayed in the first manner, the other halve is displayed in a different manner.

2. The method of claim 1, wherein filtering includes filtering based on a direction vector information included in the received traffic collision and avoidance information and a direction vector of the host aircraft.

3. The method of claim 1, wherein displaying includes indicating vertical direction of travel of the associated target aircraft.

4. The method of claim 1, wherein indicating threat level includes displaying the object in one of two or more colors based on an identified threat level.

5. The method of claim 4, wherein the colors include at least two of blue, amber, red or cyan.

6. The method of claim 1, wherein displaying includes displaying the object in one of two or more transparency levels based on angular information included in the traffic collision and avoidance information.

7. The method of claim 1, wherein displaying includes displaying the object in one of two or more color fade levels based on angular information included in the traffic collision and avoidance information.

8. A traffic collision and avoidance system for a host aircraft, the system comprising:
   a receiver for receiving traffic information from one or more target aircraft;
   a processor coupled to the receiver for determining threat levels of target aircraft associated with the received traffic information, filtering the one or more target aircraft based on a threshold value, and generating one or more objects based on the filtering; and
   a vertical situation display coupled to the processor for displaying the generated one or more objects that are associated with threat levels within the pre-defined threat level,
   wherein the displayed objects are displayed in one of two or more sizes based on threat level information and are presented in a vertical profile view; and
   wherein the threshold value includes a position threshold value and a threat threshold value,
   wherein each of the displayed objects includes a graphical object having an equator line, the equator line includes two halves, when a first one of the two halves is displayed in a first manner, the associated target aircraft is laterally left of the host aircraft, when the second one of the two halves is displayed in the first manner, the associated target aircraft is laterally right of the host aircraft, when one of the halves is displayed in the first manner, the other half is displayed in a different manner.

9. The system of claim 8, wherein the processor filters based on a direction vector information included in the received traffic collision and avoidance information and a direction vector of the host aircraft.

10. The system of claim 8, wherein the displayed objects include a second indicator for indicating vertical direction of travel of the associated target aircraft.

11. The system of claim 8, wherein the displayed objects are displayed in one of two or more colors based on the threat level.

12. The system of claim 11, wherein the colors include at least two of blue, amber, red, or cyan.

13. The system of claim 8, wherein the displayed objects are displayed in one of two or more transparency levels based on angular information included in the traffic collision and avoidance information.

14. The system of claim 8, wherein the displayed objects are displayed in one of two or more color fade levels based on angular information included in the traffic collision and avoidance information.

* * * * *